United States Patent
Yuan et al.

(10) Patent No.: US 12,511,791 B2
(45) Date of Patent: Dec. 30, 2025

(54) POINT CLOUD DECODING AND ENCODING METHOD, AND DECODER, ENCODER AND ENCODING AND DECODING SYSTEM

(71) Applicant: GUANGDONG OPPO MOBILE TELECOMMUNICATIONS CORP., LTD., Dongguan (CN)

(72) Inventors: Hui Yuan, Dongguan (CN); Ming Li, Dongguan (CN); Qi Liu, Dongguan (CN); Lu Wang, Dongguan (CN); Xiaohui Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 344 days.

(21) Appl. No.: 18/127,435

(22) Filed: Mar. 28, 2023

(65) Prior Publication Data
US 2023/0237704 A1    Jul. 27, 2023

Related U.S. Application Data

(63) Continuation of application No. PCT/CN2020/119687, filed on Sep. 30, 2020.

(51) Int. Cl.
G06T 9/00    (2006.01)

(52) U.S. Cl.
CPC .................. *G06T 9/001* (2013.01)

(58) Field of Classification Search
CPC ....... G06T 9/001; G06T 9/004; H04N 19/117; H04N 19/597; H04N 19/80
See application file for complete search history.

(56) References Cited

U.S. PATENT DOCUMENTS

| 10,861,196 B2 | 12/2020 | Mammou |
| 10,897,269 B2 | 1/2021 | Mammou |

(Continued)

FOREIGN PATENT DOCUMENTS

| CN | 109257604 A | 1/2019 |
| CN | 111095929 A | 5/2020 |

(Continued)

OTHER PUBLICATIONS

Zhou Fan, "Research on Point Cloud Attribute Compression Algorithm", (China Master's Thesis Full-text Database) Feb. 29, 2020 (Feb. 29, 2020).

(Continued)

*Primary Examiner* — Stephen G Sherman
(74) *Attorney, Agent, or Firm* — BAYES PLLC

(57) ABSTRACT

A point cloud decoding method comprises: parsing a bitstream of a point cloud to obtain reconstructed information of position information of a target point in the point cloud; obtaining predicted values of attribute information of the target point according to the reconstruction information of the position information of the target point; parsing the bitstream to obtain residual values of the attribute information of the target point; obtaining initial reconstructed values of the attribute information of the target point according to the predicted values and the residual values of the attribute information of the target point; filtering the initial reconstructed values of the attribute information of the target point by using a Kalman filtering algorithm, to obtain final reconstructed values of the attribute information of the target point; and obtaining a decoded point cloud according to the final reconstructed values of the attribute information of the target point.

9 Claims, 7 Drawing Sheets

(56) References Cited

U.S. PATENT DOCUMENTS

| | | | | |
|---|---|---|---|---|
| 2003/0099403 A1* | 5/2003 | Shefer | .................. | H04N 19/593 |
| | | | | 375/E7.266 |
| 2017/0347100 A1 | 11/2017 | Chou | | |
| 2018/0220160 A1* | 8/2018 | Lu | ........................ | H04N 19/174 |
| 2019/0080483 A1 | 3/2019 | Mammou et al. | | |
| 2019/0081638 A1 | 3/2019 | Mammou et al. | | |
| 2019/0087979 A1* | 3/2019 | Mammou | ............. | H04N 19/597 |
| 2020/0107048 A1 | 4/2020 | Yea et al. | | |
| 2020/0304865 A1* | 9/2020 | Yea | ...................... | H04N 19/105 |

FOREIGN PATENT DOCUMENTS

| | | |
|---|---|---|
| CN | 111247798 A | 6/2020 |
| CN | 111247802 A | 6/2020 |
| CN | 111699683 A | 9/2020 |
| WO | 2020072319 A1 | 4/2020 |

OTHER PUBLICATIONS

International Search Report in the international application No. PCT/CN2020/119687, mailed on Jun. 30, 2021.

English translation of the Written Opinion of the International Searching Authority in the international application No. PCT/CN2020/119687, mailed on Jun. 30, 2021.

Hargrave P J: "A tutorial introduction to Kalman filtering", Jan. 1, 1989, Jan. 1, 1989 (Jan. 1, 1989), p. 1/1-1/6, XP006525927, the whole document. 9 pages.

Birendra Kathariya (Huawei) et al: "[PCC] [new proposal] Binary-tree based level-of-details generation for attributes coding in G-PCC", 124. MPEG Meeting; Oct. 8, 2018-Oct. 12, 2018; Macao; (Motion Picture Expert Group or ISO/IEC JTC1/SC29/WG11), No. m44940, Oct. 10, 2018 (Oct. 10, 2018), XP030193255, abstract; sections 1, and 2.1; figures 2.1, 2.2. 7 pages.

Ohji Nakagami et al, "Third Working Draft for G-PCC (Geometry-based PCC)", 123. MPEG Meeting; Jul. 16, 2018-Jul. 20, 2018; Ljubljana; (Motion Picture Expert Group or ISO/IEC JTC1/SC29/WG11), No., n17770, Jul. 2018, XP030192941, section 3.29 on p. 8, section 9.3.2 on pp. 40-41. 46 pages.

Sehoon Yea et al: "Bilateral Filtering for Predictive Transform in G-PCC", 125. MPEG Meeting; Jan. 14, 2019-Jan. 18, 2019; Marrakech; (Motion Picture Expert Group or ISO/IEC JTC1/SC29/WG11), No. m46365, Jan. 12, 2019 (Jan. 12, 2019), XP030215006, sections 1 and 2. 4 pages.

Supplementary European Search Report in the European application No. 20955799.0, mailed on Oct. 19, 2023. 10 pages.

* cited by examiner

POINT CLOUD DECODING AND ENCODING METHOD, AND DECODER, ENCODER AND ENCODING AND DECODING SYSTEM

CROSS-REFERENCE TO RELATED APPLICATION

This is a continuation of International Application No. PCT/CN2020/119687 filed on Sep. 30, 2020, the contents of which are incorporated herein by reference in its entirety.

TECHNICAL FIELD

Embodiments of the disclosure relate to the field of point cloud encoding and decoding, and more particularly to a method for decoding a point cloud, a method for encoding a point cloud, a decoder, an encoder, and a codec system.

BACKGROUND

Point clouds have begun to spread to various fields, such as virtual reality (VR)/augmented reality (AR), robots, geographic information systems, medical fields, or the like. With the continuous improvement of a reference degree and speed of a scanning device, a large number of point clouds on a surface of an object may be accurately obtained, and usually in a scenario, hundreds of thousands of points may exist correspondingly. Such a larger number of points also brings challenges to storage and transmission in computers. Therefore, compression of points becomes a hot issue.

Compression of a point cloud is mainly to compress position information and color information of the point cloud. Specifically, octree encoding is performed on the position information of the point cloud at first, and meanwhile, the color information of the point cloud is predicted according to the octree-encoded position information, and then the color information is encoded by calculating a difference between the predicted color information and original color information, to encode the point cloud.

Up to now, how to improve a prediction effect in a process of predicting the color information is an urgent technical problem to be solved in the art.

SUMMARY

A method for decoding a point cloud, a method for encoding a point cloud, a decoder, an encoder, and a codec system are provided, which may improve accuracy of reconstruction during decoding the point cloud, thereby improving a decoding effect.

According to a first aspect, a method for decoding a point cloud is provided, including the following operations.

A bitstream of the point cloud is decoded to obtain reconstruction information of position information of a target point in the point cloud.

Predicted values of attribute information of the target point are obtained according to the reconstruction information of the position information of the target point.

The bitstream is decoded to obtain residual values of the attribute information of the target point.

Initial reconstructed values of the attribute information of the target point are obtained according to the predicted values and the residual values of the attribute information of the target point.

The initial reconstructed values of the attribute information of the target point are filtered by using a Kalman filtering algorithm, to obtain final reconstructed values of the attribute information of the target point.

A decoded point cloud is obtained according to the final reconstructed values of the attribute information of the target point.

According to a second aspect, a method for encoding a point cloud is provided, including the following operations.

Position information of a target point in the point cloud is processed, to obtain reconstruction information of the position information of the target point.

Predicted values of attribute information of the target point are obtained according to the reconstruction information of the position information of the target point.

The attribute information of the target point in the point cloud is processed, to obtain real values of the attribute information of the target point.

Residual values of the attribute information of the target point are obtained according to the predicted values and the real values of the attribute information of the target point.

A number of real values of attribute information of points need to be written into a bitstream, the real values of the attribute information of the points need to be written into the bitstream, and the residual values of the attribute information of the target point are encoded, to obtain the bitstream.

According to a third aspect, there is provided a decoder, configured to perform the method in the first aspect or implementations thereof. Specifically, the encoder includes functional modules configured to perform the method in the first aspect or implementations thereof.

According to a fourth aspect, there is provided an encoder, configured to perform the method in the second aspect or implementations thereof. Specifically, the encoder includes functional modules configured to perform the method in the second aspect or implementations thereof.

According to a fifth aspect, there is provided a decoder, including a processor and a memory. The memory is configured to store a computer program, and the processor is configured to call and run the computer program stored in the memory, to perform the method in the first aspect or implementations thereof.

According to a sixth aspect, there is provided an encoder, including a processor and a memory. The memory is configured to store a computer program, and the processor is configured to call and run the computer program stored in the memory, to perform the method in the second aspect or implementations thereof.

According to a seventh aspect, there is provided a codec system, including the decoder in any one of the third and fifth aspects or implementations thereof, and the encoder in any one of the fourth and sixth aspects or implementations thereof.

According to an eighth aspect, there is provided a chip, configured to implement the method in any one of the first and second aspects or implementations thereof. Specifically, the chip includes a processor. The processor is configured to call and run a computer program from a memory, to enable a device mounted with the chip to perform the method in any one of the first and second aspects or implementations thereof.

According to a ninth aspect, there is provided a computer-readable storage medium, configured to store a computer program. The computer program enables a computer to perform the method in any one of the first and second aspects or implementations thereof.

According to a tenth aspect, there is provided a computer program product, including a computer program instruction. The computer program instruction enables a computer to perform the method in any one of the first and second aspects or implementations thereof.

According to an eleventh aspect, there is provided a computer program that, when run on a computer, enables the computer to perform the method in any one of the first and second aspects or implementations thereof.

Based on the above technical solutions, initial reconstructed values of the attribute information of the target point are filtered by using a Kalman filtering algorithm, to obtain final reconstructed values of the attribute information of the target point, and further a decoded point cloud is obtained according to the final reconstructed values of the attribute information of the target point, such that during the point cloud decoding, reconstruction accuracy of the attribute information of the target point can be improved, quality enhancement is performed on the point reconstruction process, and correspondingly, a decoding effect of the point cloud encoding can be improved.

DETAILED DESCRIPTION

Figure 1:
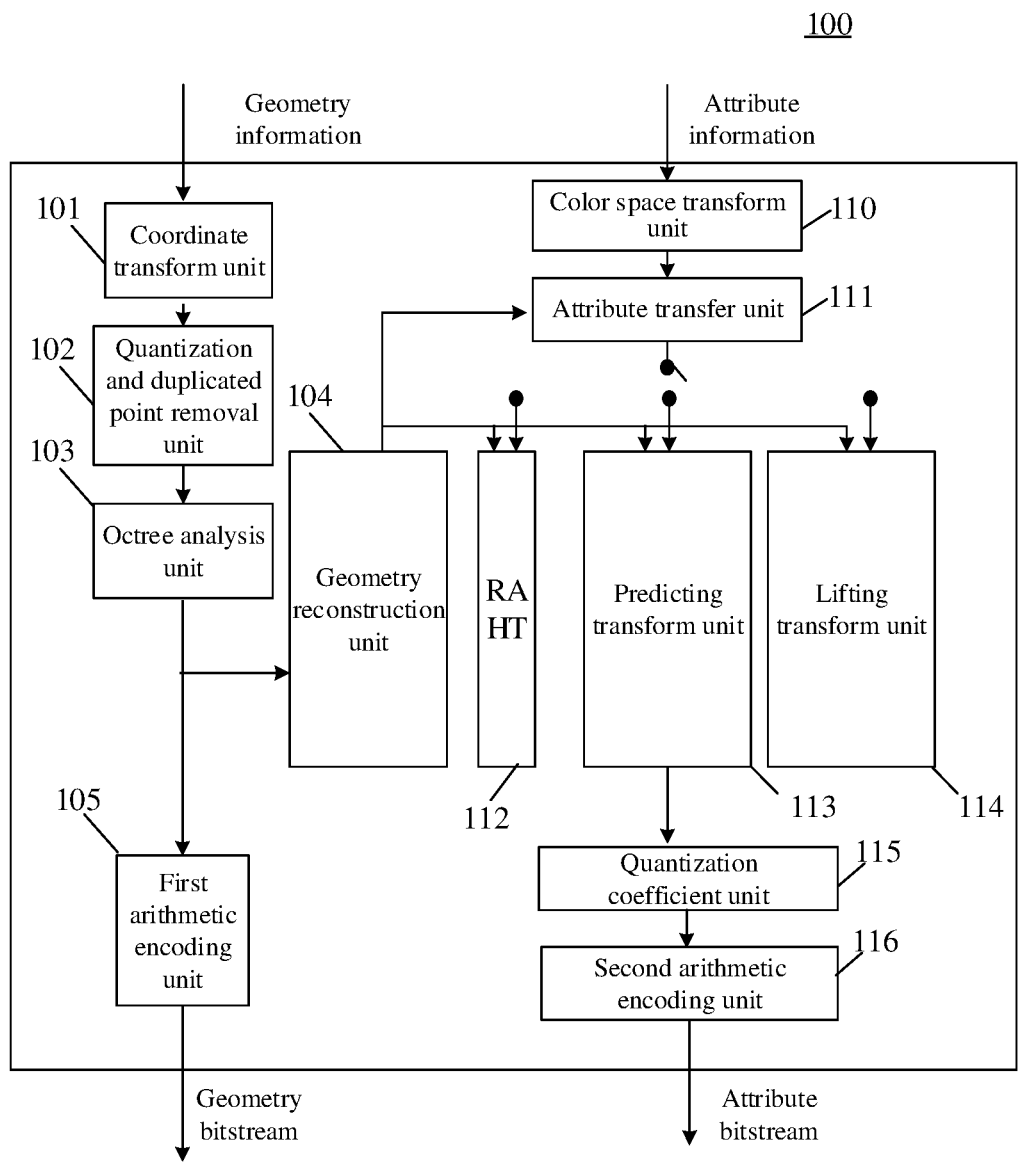
FIG. 1 is a schematic block diagram of an encoding framework according to an embodiment of the disclosure.

The disclosure is applicable to the technical field of point cloud compression.

Point cloud-related concepts are described below.

A point cloud is a three-dimensional (3D) representation form of a surface of an object, and the point cloud (data) on the surface of the object may be acquired by an acquisition device such as a photoelectric radar, a laser radar, a laser scanner, a multi-view camera, or the like.

The point cloud refers to a set of massive 3D points, and a point in the point cloud may include position information and attribute information of the point. For example, the position information of the point may be 3D coordinate information of the point. The position information of the point may also be referred to as geometric information of the point. For example, the attribute information of the point may include color information and/or reflectivity, or the like. For example, the color information may be information in any color space. For example, the color information may be RGB. For another example, the color information may be luma chroma (YcbCr, YUV) information. For example, Y represents Luma, Cb (U) represents a blue color difference, Cr (V) represents a red color difference, and U and V represent chroma and describe color difference information.

For example, in a point cloud obtained according to a laser measurement principle, a point in the point cloud may include 3D coordinate information and laser reflection intensity (reflectance) of the point. For another example, in a point cloud obtained according to a photogrammetry principle, a point in the point cloud may include 3D coordinate information and color information of the point. For another example, in a point cloud obtained by combining laser measurement and photogrammetry principles, a point in the point cloud may include 3D coordinate information, laser reflection intensity (reflectance) and color information of the point.

For example, point clouds may be divided into a first type of static point cloud, a second type of dynamic point cloud and a third type of dynamic acquisition point cloud, according to the manners of acquiring the point clouds.

For the type of first static point cloud, an object is stationary, and a device for acquiring the point cloud is also stationary.

For the second type of dynamic point cloud, an object is mobile, but a device for acquiring the point cloud is stationary.

For the third type of dynamic acquisition point cloud, a device for acquiring the point cloud is mobile.

For example, point clouds are divided into two categories, i.e., a first category and a second category, according to usage of the point clouds.

The first category is a machine perception point cloud, which may be used in scenarios such as an autonomous navigation system, a real-time inspection system, a geographic information system, a visual sorting robot, a rescue and disaster relief robot, or the like.

The second category is a human eye perception point cloud, which may be used in point cloud application scenarios such as a digital cultural heritage, a free viewpoint broadcast, 3D immersion communication, 3D immersion interaction, or the like.

Since the point cloud is a set of massive points, storage of the point cloud not only consumes a large amount of memories, but also is adverse to transmission, and such a large bandwidth which may support direct transmission of the point cloud on a network layer without compression does not exist either, therefore it is necessary to compress the point cloud.

Up to now, the point cloud may be compressed by a point cloud encoding framework.

The point cloud encoding framework may be a Geometry Point Cloud Compression (G-PCC) encoding/decoding framework or a Video Point Cloud Compression (V-PCC) encoding/decoding framework provided by a Moving Picture Experts Group (MPEG), or may be an Audio Video Standard Point Cloud Compression (AVS-PCC) encoding/decoding framework provided by an Audio Video Standard (AVS). The G-PCC encoding/decoding framework may be used to compress the first type of static point cloud and the third type of dynamic acquisition point cloud, and the V-PCC encoding/decoding framework may be used to compress the second type of dynamic point cloud. The G-PCC encoding/decoding framework is also referred to as a point cloud codec TMC 13, and the V-PCC encoding/decoding framework is also referred to as a point cloud codec TMC 2.

An encoding/decoding framework to which embodiments of the disclosure are applicable is described below by example of the G-PCC encoding/decoding framework.

FIG. 1 is a schematic block diagram of an encoding framework 100 according to an embodiment of the disclosure.

As illustrated in FIG. 1, the encoding framework 100 may obtain position information and attribute information of a point cloud from an acquisition device. Encoding of the point cloud includes position encoding and attribute encoding. In an embodiment, the process of position encoding includes: performing, on an original point cloud, pre-processing such as coordinate transformation, quantization and duplicated point removal, or the like; and constructing an octree and then performing encoding, to form a geometry bitstream.

The process of attribute encoding includes: selecting one of three prediction modes according to real values of attribute information and reconstruction information of position information of a given input point cloud, to predict the point cloud; quantizing the predicted result; and performing arithmetic encoding, to form an attribute bitstream.

As illustrated in FIG. 1, the position encoding may be implemented by a coordinate transform unit 101 (Transform coordinates), a quantization and duplicated point removal unit 102 (Quantize and remove points), an octree analysis unit 103 (Analyze octree), a geometry reconstruction unit 104 (Reconstruct geometry), and a first arithmetic encoding unit 105 (Arithmetic encode).

The coordinate transform unit 101 may be configured to transform world coordinates of a point in the point cloud into relative coordinates.

For example, subtraction of minimum values of X, Y, Z coordinate axes from geometric coordinates of the point respectively is equivalent to a Direct Current (DC) removal operation, so as to transform coordinates of the point in the point cloud from the world coordinates into the relative coordinates.

The quantization and duplicated point removal unit 102 may reduce a number of coordinates by quantization, and after quantization, the same coordinate may be assigned to different points. Based on this, duplicated points may be removed by a deduplication operation. For example, multiple clouds having the same quantization position and different attribute information may be merged into a cloud by attribute transformation. In some embodiments of the disclosure, the quantization and duplicated point removal unit 102 is an optional unit.

The octree analysis unit 103 may use an octree encoding mode to encode position information of the quantized points.

For example, the point cloud is partitioned according to an octree form, so that positions of points may have a one-to-one correspondence with positions of the octree, and each position where a point exists in the octree is counted and denoted by a flag of 1, to perform geometric encoding.

The first arithmetic encoding unit 105 may perform arithmetic encoding on the position information output by the octree analysis unit 103 by using the entropy encoding, that is, arithmetic encoding is performed on the position information output by the octree analysis unit 103 to generate a geometry bitstream.

The attribute encoding may be implemented by a color space transform unit 110 (Transform colors), an attribute transfer unit 111 (Transfer attributes), a Region Adaptive Hierarchical Transform (RAHT) unit 112, a predicting transform unit 113, a lifting transform unit 114, a quantization coefficient unit 115 (Quantize coefficients), and a second arithmetic encoding unit 116.

The color space transform unit 110 may be configured to transform an RGB color space of a point in the point cloud into a YCbCr format or another format.

The attribute transfer unit 111 may be configured to transform attribute information of points in the point cloud, to minimize attribute distortion. For example, the attribute transfer unit 111 may be configured to obtain real values of the attribute information of the points. For example, the attribute information may be color information of the points.

After the real value of the attribute information of the point is obtained by transformation of the attribute transfer unit 111, any one of prediction units may be selected to predict the point in the point cloud. The prediction units may include RAHT 112, the predicting transform unit 113, and the lifting transform unit 114.

In other words, any one of RAHT 112, the predicting transform unit 113 and the lifting transform unit 114 may be configured to predict the attribute information of the point in the point cloud, to obtain a predicted value of the attribute information of the point, and then obtain a residual value of the attribute information of the point based on the predicted value of the attribute information of the point.

For example, the residual value of the attribute information of the point may be the real value of the attribute information of the point minus the predicted value of the attribute information of the point.

In an embodiment of the disclosure, the predicting transform unit 113 may be further configured to generate a level of detail (LOD). The process of generating the LOD includes: obtaining Euclidean distances between points according to position information of the points in the point cloud; and classifying the points into different LOD layers according to the Euclidean distances. In an embodiment, after the Euclidean distances are sorted, Euclidean distances in different ranges may be divided into different LOD layers.

For example, a point may be randomly selected as a first LOD layer. Then, Euclidean distances between remaining points and the point are calculated, and points with Euclidean distances meeting a first threshold are classified as a second LOD layer. A centroid of the points in the second LOD layer is obtained, Euclidean distances between points except the first and second LOD layers and the centroid are calculated, and points with Euclidean distances meeting a second threshold are classified as a third LOD layer. By analogy, all points are classified into LOD layers. A number of points in each LOD layer may be incremented by adjusting thresholds of the Euclidean distances. It should be understood that the LOD layers may be partitioned in other manners, which is not limited in the disclosure.

It is to be noted that the point cloud may be directly partitioned into one or more LOD layers, or the point cloud may be partitioned into slices, and then each of the slices is partitioned into one or more LOD layers.

For example, the point cloud may be partitioned into multiple slices, and a number of points in each of the slices may be 0.55 million to 1.1 million. Each of the slices may be considered as a separate point cloud. Each of the slices may be further partitioned into LOD layers, and each LOD layer includes multiple points. In an embodiment, partition of the LOD layers may be performed according to Euclidean distances between points.

The quantization coefficient unit 115 may be configured to quantize the residual value of the attribute information of the point. For example, when the quantization coefficient unit 115 is connected to the predicting transform unit 113, the quantization coefficient unit may be configured to quantize a residual value of attribute information of a point output by the predicting transform unit 113.

For example, the residual value of the attribute information of the point output by the predicting transform unit 113 is quantized by using a quantization step size, to improve system performance.

The second arithmetic encoding unit 116 may perform entropy coding on the residual value of the attribute information of the point by using zero run length coding, to obtain an attribute bitstream. The attribute bitstream may be bitstream information.

It should be understood that in the disclosure, the predicted value (predictedvalue) of the attribute information of the point in the point cloud may also be referred to as a predicted color value (predictedColor) in an LOD mode. The residual value (residualvalue) of the point may be obtained by subtracting the predicted value of the attribute information of the point from the real value of the attribute information of the point. The residual value of the attribute information of the point may also be referred to as a residual color value (residualColor) in the LOD mode. The predicted value and the residual value of the attribute information of the point may be added to generate a reconstructed value (reconstructedvalue) of the attribute information of the point. The reconstructed value of the attribute information of the point may also be referred to as a reconstructed color value (reconstructedColor) in the LOD mode.

Figure 2:
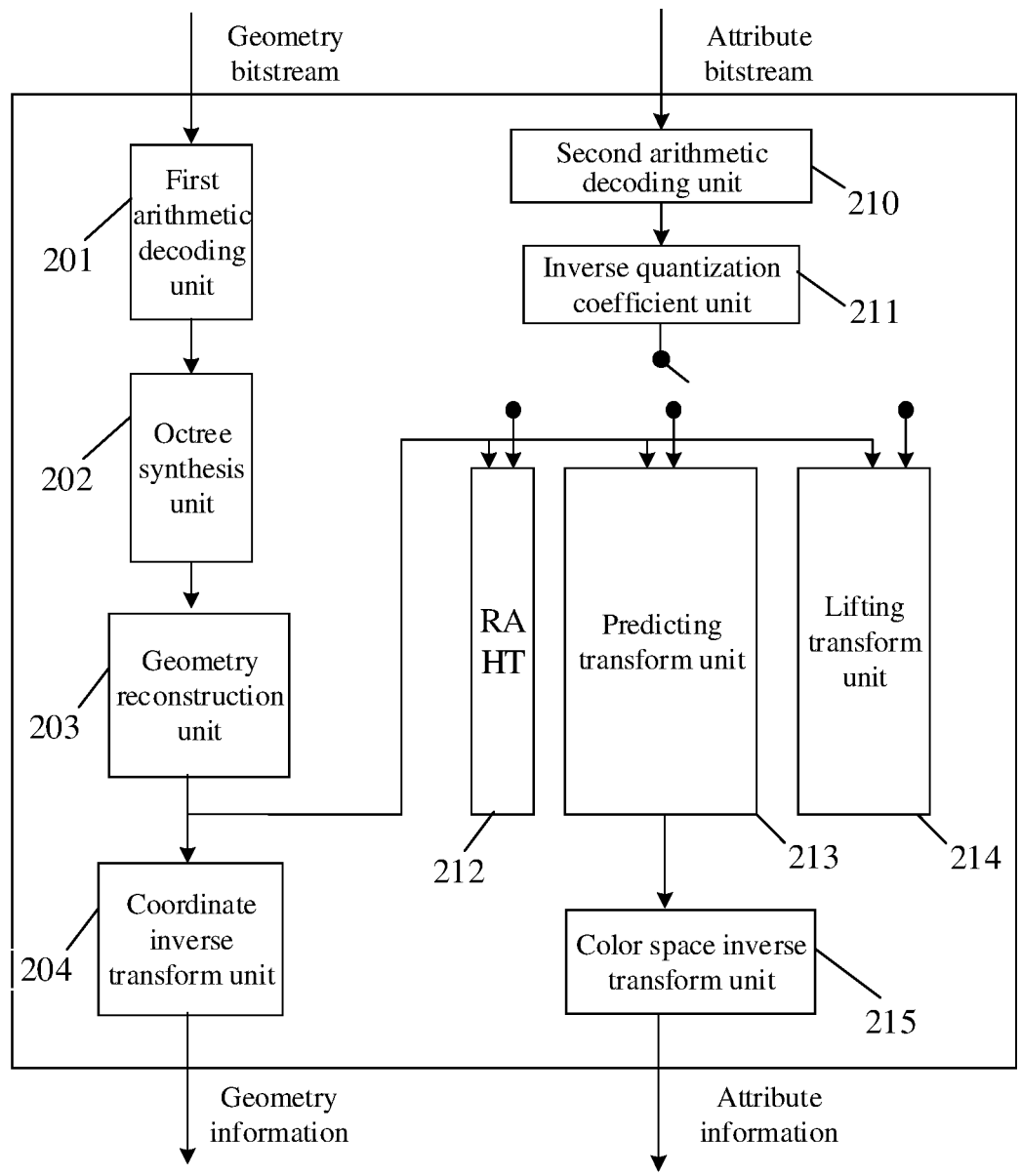
FIG. 2 is a schematic block diagram of a decoding framework according to an embodiment of the disclosure.

FIG. 2 is a schematic block diagram of a decoding framework 200 according to an embodiment of the disclosure.

As illustrated in FIG. 2, the decoding framework 200 may obtain a bitstream of a point cloud from an encoding device, and obtain position information and attribute information of a point in the point cloud by parsing the bitstream. Decoding of the point cloud includes position decoding and attribute decoding. In an embodiment, the process of position decoding includes: performing arithmetic decoding on a geometry bitstream; constructing an octree and then performing merging, and reconstructing the position information of the point, to obtain reconstruction information of the position information of the point; and performing coordinate transformation on the reconstruction information of the position information of the point, to obtain the position information of the point. The position information of the point may also be referred to as geometric information of the point.

The process of the attribute decoding includes: obtaining residual values of attribute information of a point in the point cloud by parsing an attribute bitstream; performing inverse quantization on the residual values of the attribute information of the point, to obtain residual values of attribute information of the point subject to the inverse quantization; selecting one of three prediction modes based on the reconstruction information of the position information of the point obtained in the process of position decoding to predict the point cloud, so as to obtain reconstructed values of the attribute information of the point; and performing color space inverse transformation on the reconstructed values of the attribute information of the point, to obtain a decoded point cloud.

As illustrated in FIG. 2, the position decoding may be implemented by a first arithmetic decoding unit 201, an octree synthesis unit 202, a geometry reconstruction unit 204, and a coordinate inverse transform unit 205.

The attribute encoding may be implemented by a second arithmetic decoding unit 210, an inverse quantization coefficient unit 211, a RAHT unit 212, a predicting transform unit 213, a lifting transform unit 214, and a color space inverse transform unit 215 (inverse transform colors).

It should be noted that decompression is an inverse process of compression, and similarly, functions of units in the decoding framework 200 may refer to functions of corresponding units in the encoding framework 100.

For example, the decoding framework 200 may partition a point cloud into multiple LODs according to Euclidean distances between points in the point cloud. Then, the decoding framework 200 may decode attribute information of points in LOD in sequence, for example, calculate a number (zero_cnt) of zeros in a zero run length encoding technology to decode a residual value based on zero_cnt. Next, the decoding frame 200 may perform inverse quantization based on the decoded residual value, and obtain a reconstructed value of the point by adding the inverse-quantized residual value to a predicted value of the current point, until all the points are decoded. The current point will be used as the nearest neighbor of points in subsequent LODs, and attribute information of subsequent points are predicted by using the reconstructed value of the current point.

Figure 3:
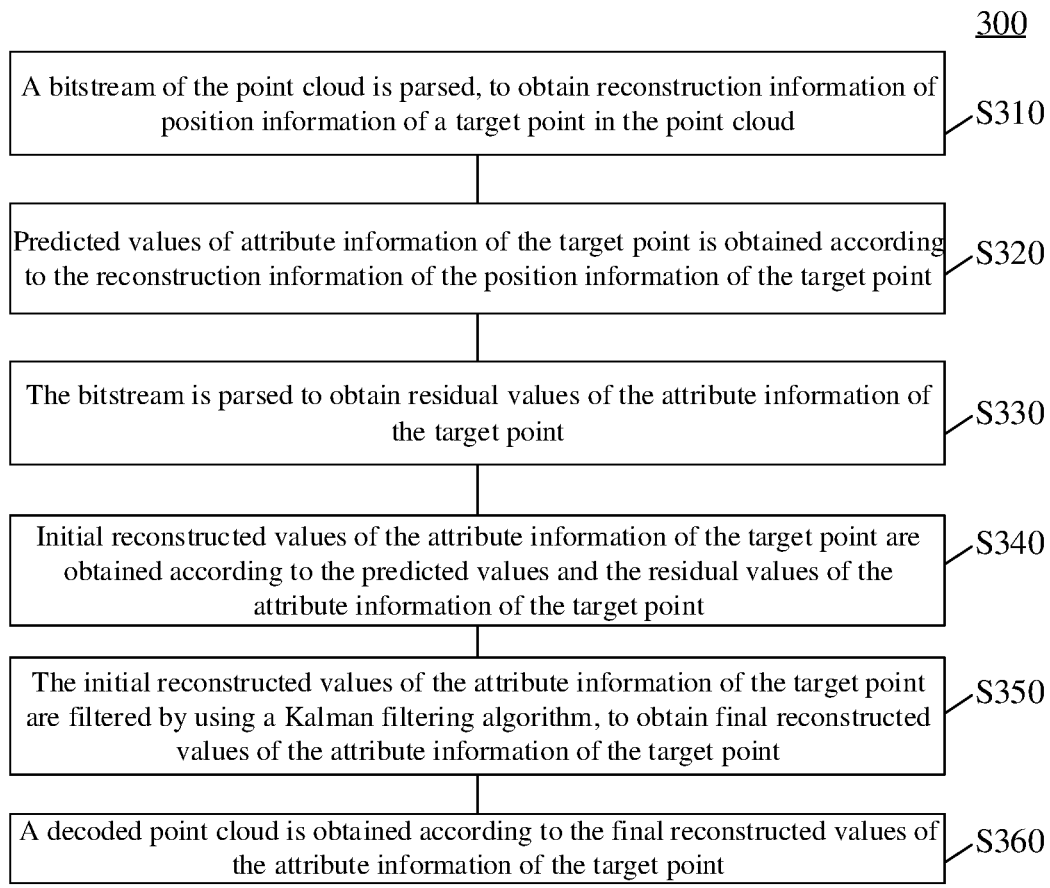
FIG. 3 is a schematic block diagram of a method for decoding a point cloud according to an embodiment of the disclosure.

FIG. 3 illustrates a schematic flowchart of a method 300 for decoding a point cloud according to an embodiment of the disclosure, and the method 300 may be performed by a decoding end, such as the decoding framework 200 illustrated in FIG. 2, i.e., the point cloud decoder TMC 13. In order to facilitate descriptions, technical solutions of the disclosure are described below by taking the decoder as an execution body.

As illustrated in FIG. 3, the method 300 may include the following operations.

In S310, a bitstream of the point cloud is parsed, to obtain reconstruction information of position information of a target point in the point cloud.

In S320, predicted values of attribute information of the target point are obtained according to the reconstruction information of the position information of the target point.

In S330, the bitstream is parsed to obtain residual values of the attribute information of the target point.

In S340, initial reconstructed values of the attribute information of the target point are obtained according to the predicted values and the residual values of the attribute information of the target point.

In S350, the initial reconstructed values of the attribute information of the target point are filtered by using a Kalman filtering algorithm, to obtain final reconstructed values of the attribute information of the target point.

In S360, a decoded point cloud is obtained according to the final reconstructed values of the attribute information of the target point.

For example, the Kalman filtering algorithm may be implemented by a recursive filter which may also be referred to as an autoregressive filter.

For example, final reconstructed values of attribute information of all points in the point cloud may be used to obtain the decoded point cloud.

For example, the residual values of the attribute information of the target point may be residual values subjected to inverse quantization, or may be residual values without inverse quantization.

Initial reconstructed values of the attribute information of the target point are filtered by using the Kalman filtering algorithm, to obtain final reconstructed values of the attribute information of the target point, and further a decoded point cloud is obtained according to the final reconstructed values of the attribute information of the target point, such that during the point cloud decoding, reconstruction accuracy of the attribute information of the target point can be improved, quality enhancement is performed on the point reconstruction process, and correspondingly, a decoding effect of the point cloud encoding can be improved.

It should be noted that the point cloud involved in the disclosure may be a complete point cloud, or may be a slice formed after the complete point cloud is partitioned.

A principle of Kalman filtering is described below with reference to FIG. 4.

Figure 4:
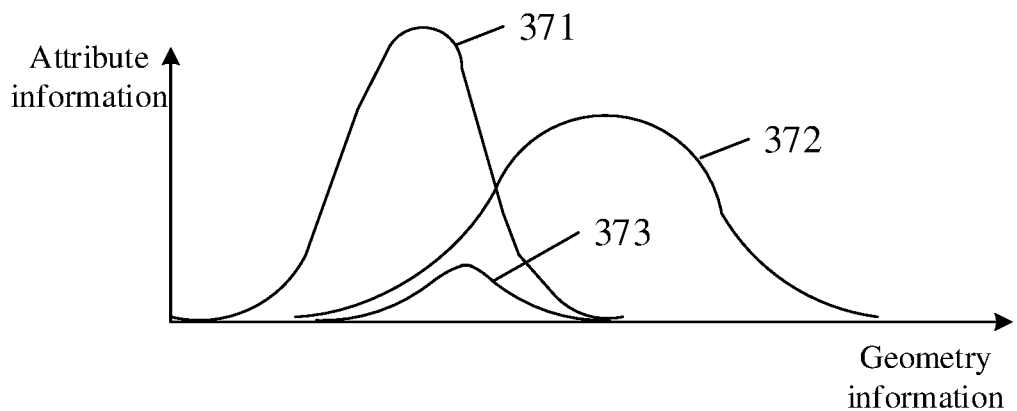
FIG. 4 is a schematic diagram of a principle of Kalman filtering according to an embodiment of the disclosure.

FIG. 4 is a schematic diagram of a principle of Kalman filtering according to an embodiment of the disclosure.

As illustrated in FIG. 4, initial reconstructed values of attribute information of a target point may be represented by a curve 371, and final reconstructed values of the attribute information of the target point may be represented by a curve 372, and measurement values of the attribute information of the target point may be represented by a curve 373. In other words, the initial reconstructed values of the attribute information of the target point may be filtered by using the measurement values of the attribute information of the target point, to obtain the final reconstructed values of the attribute information of the target point. The initial reconstructed values may also be referred to as priori estimation values, and the final reconstructed values may also be referred to as optimal estimation values or posteriori estimation values.

For example, a state of a dynamic system may be estimated based on a series of incomplete or noisy measurement values, to obtain initial reconstructed values. Then, a prediction error may be gradually reduced by continuously performing iterative updating based on the measurement values and the initial reconstructed values, so that the reconstructed values are gradually accurate to obtain final reconstructed values.

For example, Kalman filtering of the target point in the point cloud may be divided into a prediction process and a correction process. It is assumed that the target point is the k-th point in the point cloud. In the prediction process, a state of the k-th point may be estimated according to initial reconstructed values of the (k−1)-th point. In the correction process, the initial reconstructed values of the k-th point may be corrected by using measurement values of the k-th point, to obtain final reconstructed values of the k-th point.

For example, the k-th point may be predicted according to Formula 1, to obtain the initial reconstructed values of the k-th point:

$$\hat{x}'_k = A\hat{x}_{k-1} + Bu_k$$

$$P'_k = AP_{k-1}A^T + Q \quad \text{(Formula 1)}$$

$\hat{x}'_k$ represents the initial reconstructed values of the k-th point, A represents a state transition matrix, $\hat{x}_{k-1}$ represents the final reconstructed values of the (k−1)th point, B represents a control input matrix, $u_k$ represents input information, $P'_k$ represents covariance of $\hat{x}'_k$, $P_{k-1}$ represents covariance of $\hat{x}_{k-1}$, Q represents a process excitation noise covariance which may also be referred to as covariance of a system process.

For example, correction may be performed according to Formula 2, to obtain the final reconstructed values of the k-th point:

$$\hat{z}_k = z_k - H\hat{x}'_k$$

$$K_k = P'_k H^T (HP'_k H^T + R)^{-1}$$

$$\hat{x}_k = \hat{x}'_k + K_k \hat{z}_k \quad \text{(Formula 2)}$$

$\hat{z}_k$ represents residual values of the measurement values of the k-th point with respect to initial reconstructed values of the k-th point, $z_k$ represents the measurement values of the k-th point, $\hat{x}'_k$ represents the initial reconstructed values of the k-th point, H represents a state observation matrix. $K_k$ represents a Kalman gain, $P'_k$ represents covariance of $\hat{x}'_k$, R represents a system inaccuracy matrix. $\hat{x}_k$ represents the final reconstructed values of the k-th point.

For example, the covariance may be updated according to Formula 3:

$$P_k = (I - K_k H) P'_k \quad \text{(Formula 3)}$$

$P_k$ represents covariance of $\hat{x}_k$, $P'_k$ represents covariance of $\hat{x}_k$.

In other alternative embodiments, each of the Formulas 1 to 3 may also be transformed into a programming language structure, which is not specifically limited in the disclosure.

In some embodiments of the disclosure, the operation in S350 may further include the following operations.

The initial reconstructed values of the attribute information of the target point are filtered by using the Kalman filtering algorithm and taking reconstructed values of attribute information of one or more points before the target point as measurement values, to obtain the final reconstructed values of the attribute information of the target point.

For example, a reconstructed value of attribute information of one or more points before the target point may be a reconstructed value of attribute information of a point before the target point. For another example, a reconstructed value of attribute information of one or more points before the target point may be a mean value, a maximum value, or a minimum value of reconstructed values of attribute information of points before the target point.

For example, one or more points before the target point are one or more points before the target point in a decoding order. Of course, one or more points before the target point may also be one or more points determined in other orders.

For example, initial reconstructed values of attribute information of one or more points before the target point are taken as measurement values, and the initial reconstructed values of the attribute information of the target point are filtered by using the Kalman filtering algorithm, to obtain the final reconstructed value of the attribute information of the target point. For example, final reconstructed values of attribute information of one or more points before the target point are taken as measurement values, the initial reconstructed values of the attribute information of the target point are filtered by using the Kalman filtering algorithm, to obtain the final reconstructed values of the attribute information of the target point.

It should be understood that one or more points before the target point may be understood as one or more points located before the target point in a LOD layer including the target point, or may be understood as one or more points prior to the target point in a coding order.

In some embodiments of the disclosure, the method 300 may further include the following operations.

For a LOD layer in the point cloud, in response to a number of points in the LOD layer being less than a threshold T, final reconstructed values of attribute information of all points in the LOD layer are replaced by real values of the attribute information; and in response to the number of points in the LOD layer being greater than or equal to the threshold T, final reconstructed values of attribute information of the (n×T)-th point are replaced by real values of the attribute information. T is a positive integer greater than 1, and n is a positive integer greater than or equal to 0.

For example, the above determination may be performed on each or part of LOD layers in the point cloud.

For example, a value of the variable n may range from 0 to m, and m×T is less than or equal to the number of points in the LOD layer. For example, for each LOD layer, n×T points may equally divide points in the LOD layer.

In other embodiments, when the number of points in the LOD layer is less than 8, final reconstructed values of attribute information of all points in the LOD layer are replaced by the real values of the attribute information, and when the number of points in the LOD layer is greater than or equal to 8, other points in the LOD are equally divided into 8 equal parts by using points of which final reconstructed values of attribute information need to be replaced by the real values.

It should be understood that a specific value of T is not limited in the disclosure.

For example, T may be 8 or 10.

Final reconstructed values of attribute information of points are replaced by the real values of the attribute information, which may further improve the decoding effect.

In some embodiments of the disclosure, the operation in S350 may include the following operations.

The bitstream is parsed, to obtain the number of points in the bitstream of which final reconstructed values of attribute information are real values and the real values of the attribute information of the points.

For example, the bitstream may include the following encoded information: a number of points of which final reconstructed values of attribute information are real values, real values of attribute information of the points, and residual values of attribute information of all points in the point cloud.

In an embodiment, positions of the points of which final reconstructed values of the attribute information are the real values may also be obtained by decoding the bitstream.

In some embodiments of the disclosure, the operation in S350 may include the following operations.

The point cloud is partitioned into one or more LOD layers, and each LOD layer includes one or more points.

For example, the point cloud is partitioned into multiple LOD layers.

Figure 5:
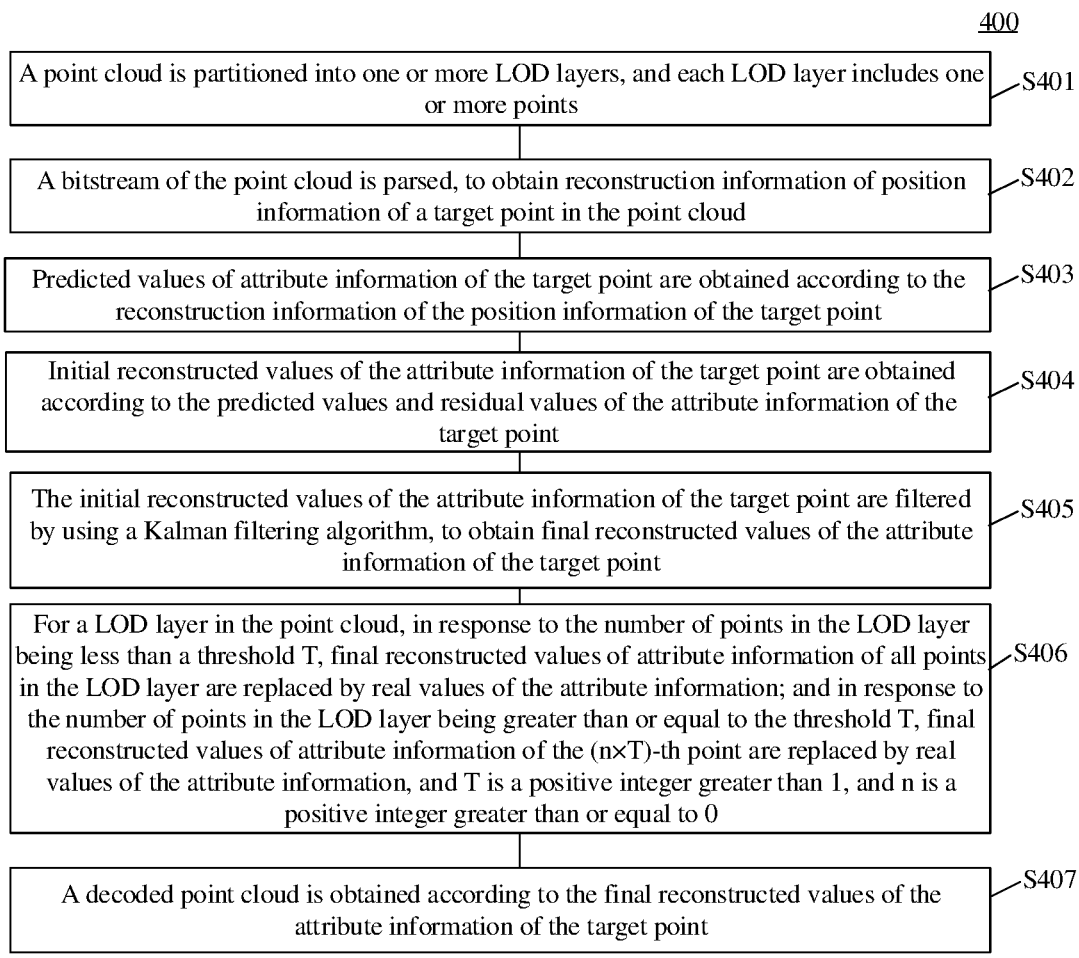
FIG. 5 is another schematic flowchart of a method for decoding a point cloud according to an embodiment of the disclosure.

FIG. 5 is a schematic flowchart of a method 400 for decoding a point cloud according to an embodiment of the disclosure.

As illustrated in FIG. 4, the method 400 includes some or all of the following operations.

In S401, a point cloud is partitioned into one or more LOD layers, and each LOD layer includes one or more points.

In S402, a bitstream of the point cloud is parsed, to obtain reconstruction information of position information of a target point in the point cloud.

In S403, predicted values of attribute information of the target point are obtained according to the reconstruction information of the position information of the target point.

In S404, initial reconstructed values of the attribute information of the target point are obtained according to the predicted values and residual values of the attribute information of the target point.

In S405, the initial reconstructed values of the attribute information of the target point are filtered by using a Kalman filtering algorithm, to obtain final reconstructed values of the attribute information of the target point.

In S406, for a LOD layer in the point cloud, in response to the number of points in the LOD layer being less than a threshold T, final reconstructed values of attribute information of all points in the LOD layer are replaced by real values of the attribute information; and in response to the number of points in the LOD layer being greater than or equal to the threshold T, final reconstructed values of attribute information of the (n×T)-th point are replaced by real values of the attribute information. T is a positive integer greater than 1, and n is a positive integer greater than or equal to 0.

In S407, a decoded point cloud is obtained according to the final reconstructed values of the attribute information of the target point.

The method for decoding a point cloud according to an embodiment of the disclosure is described in detail as above from the perspective of a decoder with reference to FIG. 2 to FIG. 5, and a method for encoding a point cloud according to an embodiment of the disclosure is described below from the perspective of an encoder with reference to FIG. 6.

Figure 6:
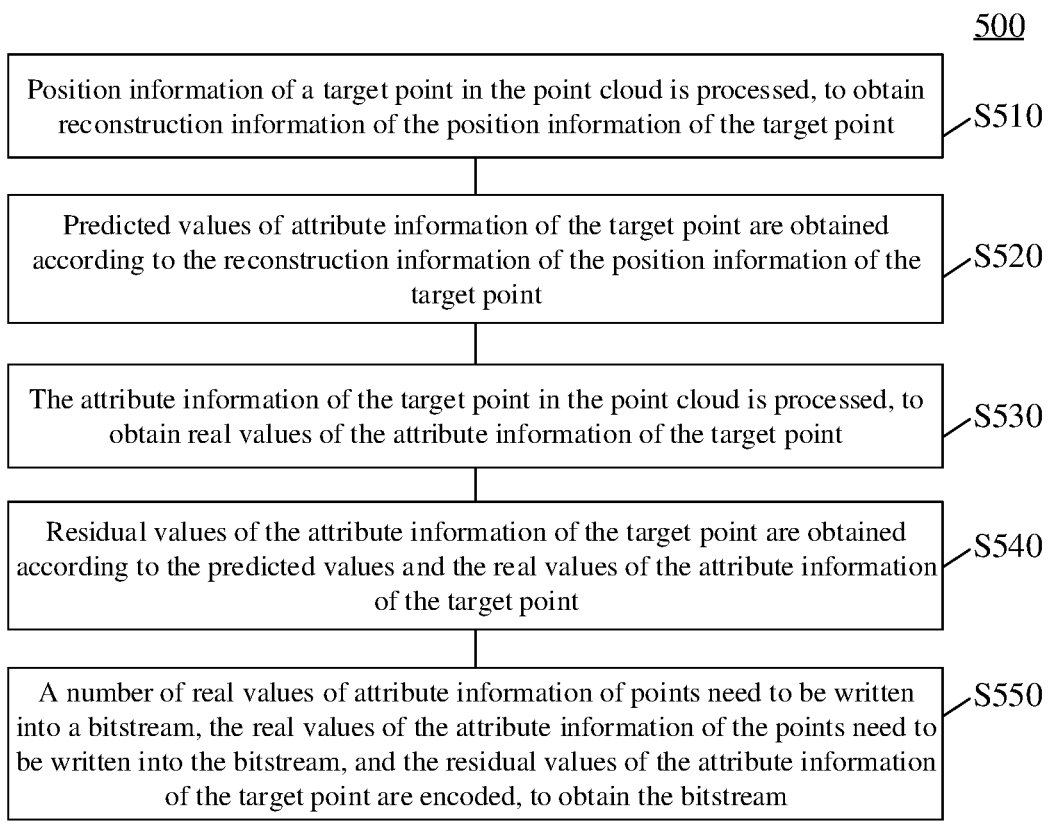
FIG. 6 is a schematic flowchart of a method for encoding a point cloud according to an embodiment of the disclosure.

FIG. 6 illustrates a schematic flowchart of a method 500 for encoding a point cloud according to an embodiment of the disclosure. The method 500 may be executed by an encoding end, such as the encoding framework 100 illustrated in FIG. 2 or an encoder.

As illustrated in FIG. 6, the method 500 may include the following operations.

In S510, position information of a target point in the point cloud is processed, to obtain reconstruction information of the position information of the target point.

In S520, predicted values of attribute information of the target point are obtained according to the reconstruction information of the position information of the target point.

In S530, the attribute information of the target point in the point cloud is processed, to obtain real values of the attribute information of the target point.

In S540, residual values of the attribute information of the target point are obtained according to the predicted values and the real values of the attribute information of the target point.

In S550, a number of real values of attribute information of points need to be written into a bitstream, the real values of the attribute information of the points need to be written into the bitstream, and the residual values of the attribute information of the target point are encoded, to obtain the bitstream.

The number of real values of the attribute information of the points, positions of the points, and the real values of the attribute information of the points are written into the bitstream, which may improve the decoding effect.

In some embodiments of the disclosure, the method 500 may further include the following operations.

For a LOD layer in the point cloud, in response to the number of points in the LOD layer being less than a threshold T, it is determined that real values of attribute information of all points in the LOD layer need to be written into the bitstream; and in response to the number of points in the LOD layer being greater than or equal to the threshold T, it is determined that real values of attribute information of an (n×T)-th point need to be written into the bitstream. T is a positive integer greater than 1, and n is a positive integer greater than or equal to 0.

In some embodiments of the disclosure, the method 500 may further include the following operation.

The point cloud is partitioned into one or more LOD layers. Each LOD layer includes one or more points.

It should be understood that the method 500 for encoding a point cloud is an inverse process of the method for decoding a point cloud. Operations in the method 500 for encoding a point cloud may refer to corresponding operations in the method 300 or 400 for decoding a point cloud, and are not elaborated here to avoid repetition.

Preferred embodiments of the disclosure are described in detail above with reference to the drawings, however, the disclosure is not limited to specific details in the above embodiments. Any variations may be made to the technical solutions of the disclosure within the technical conception of the present disclosure and shall fall within the scope of protection of the disclosure. For example, the various specific technical features described in the above embodiments may be combined in any suitable way without conflict, and the various possible combinations are not described separately in order to avoid unnecessary repetition. For example, the various embodiments of the disclosure may also be combined in any manner without departing from the concept of the disclosure and the resulting technical solutions shall also fall within the scope of protection of the disclosure.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

The method embodiments of the disclosure are described in detail above with reference to FIG. 1 to FIG. 6, and device embodiments of the disclosure are described in detail below with reference to FIG. 7 to FIG. 9.

Figure 7:
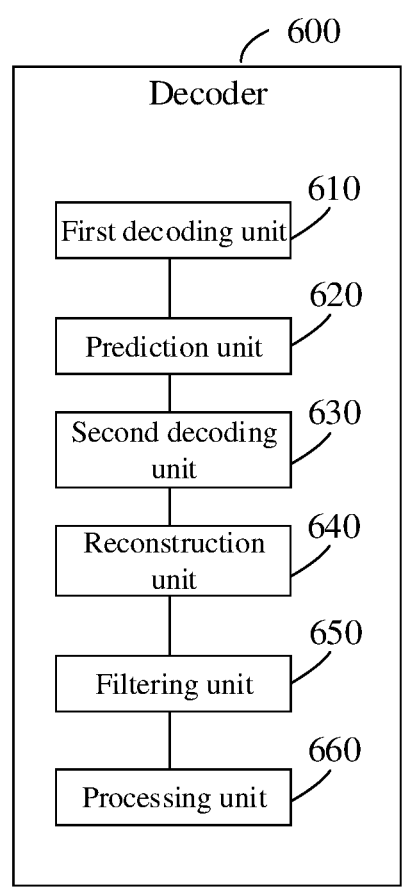
FIG. 7 is a schematic block diagram of a decoder according to an embodiment of the disclosure.

FIG. 7 is a schematic block diagram of a decoder 600 according to an embodiment of the disclosure.

As illustrated in FIG. 7, the decoder 600 includes a first decoding unit 610, a prediction unit 620, a second decoding unit 630, a reconstruction unit 640, a filtering unit 650, and a processing unit 660.

The first decoding unit 610 is configured to parse a bitstream of a point cloud, to obtain reconstruction information of position information of a target point in the point cloud.

The prediction unit 620 is configured to obtain predicted values of attribute information of the target point according to the reconstruction information of the position information of the target point.

The second decoding unit 630 is configured to parse the bitstream, to obtain residual values of the attribute information of the target point.

The reconstruction unit 640 is configured to obtain initial reconstructed values of the attribute information of the target point according to the predicted values and the residual values of the attribute information of the target point.

The filtering unit 650 is configured to filter the initial reconstructed values of the attribute information of the target point by using a Kalman filtering algorithm, to obtain final reconstructed values of the attribute information of the target point.

The processing unit 660 is configured to obtain a decoded point cloud according to the final reconstructed values of the attribute information of the target point.

In some embodiments of the disclosure, the filtering unit 650 is specifically configured to filter the initial reconstructed values of the attribute information of the target point by using the Kalman filtering algorithm and taking reconstructed values of attribute information of one or more points before the target point as measurement values, to obtain the final reconstructed value of the attribute information of the target point.

In some embodiments of the disclosure, the one or more points before the target point are one or more points before the target point in a decoding order.

In some embodiments of the disclosure, the filtering unit 650 is further configured to, for a LOD layer in the point cloud, replace final reconstructed values of attribute information of all points in the LOD layer by real values of the attribute information in response to the number of points in the LOD layer being less than a threshold T, and replace final reconstructed values of attribute information of the (n×T)-th point by real values of the attribute information in response to the number of points in the LOD layer being greater than or equal to the threshold T. T is a positive integer greater than 1, and n is a positive integer greater than or equal to 0.

In some embodiments of the disclosure, the filtering unit 650 is specifically configured to parse the bitstream, to obtain the number of points in the bitstream of which final reconstructed values of attribute information are real values and the real values of the attribute information of the points.

In some embodiments of the disclosure, the first decoding unit 610 is specifically configured to partition the point cloud into one or more LOD layers. Each LOD layer includes one or more points.

It is to be understood that the device embodiments and the method embodiments may correspond to each other, and similar descriptions may refer to the method embodiments, and are not elaborated here to avoid repetition. Specifically, the decoder 600 illustrated in FIG. 7 may correspond to an execution body for executing the method 300 according to an embodiment of the disclosure, and the foregoing and other operations and/or functions of modules in the decoder 600 implement corresponding processes in the methods illustrated in FIG. 3 or FIG. 5 respectively, and are not elaborated here for brevity.

Figure 8:
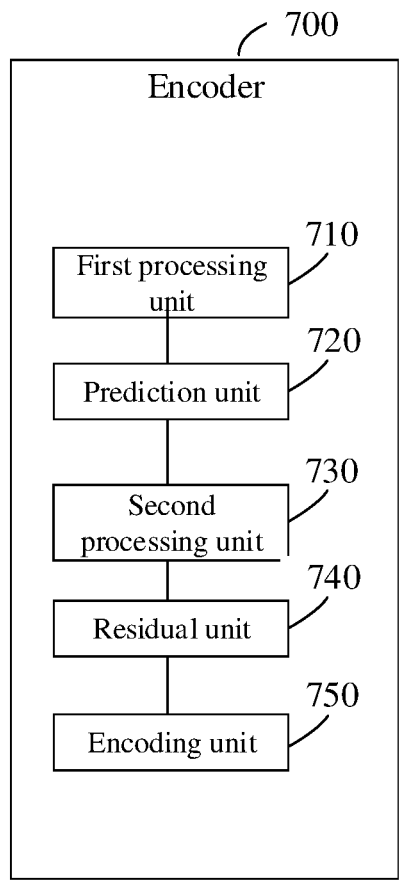
FIG. 8 is a schematic block diagram of an encoder according to an embodiment of the disclosure.

FIG. 8 is a schematic block diagram of an encoder 700 according to an embodiment of the disclosure.

As illustrated in FIG. 8, the encoder 700 includes a first processing unit 710, a prediction unit 720, a second processing unit 730, a residual unit 740, and an encoding unit 750.

The first processing unit 710 is configured to process position information of a target point in a point cloud, to obtain reconstruction information of the position information of the target point.

The prediction unit 720 is configured to obtain predicted values of attribute information of the target point according to the reconstruction information of the position information of the target point.

The second processing unit 730 is configured to process the attribute information of the target point in the point cloud, to obtain real values of the attribute information of the target point.

The residual unit 740 is configured to obtain residual values of the attribute information of the target point according to the predicted values and the real values of the attribute information of the target point.

The encoding unit 750 is configured to encode a number of real values of attribute information of points need to be written into a bitstream, the real values of the attribute information of the points need to be written into the bitstream, and the residual values of the attribute information of the target point, to obtain the bitstream.

In some embodiments of the disclosure, the encoding unit 750 is further configured to: for a LOD layer in the point cloud, in response to the number of points in the LOD layer being less than a threshold T, determine that real values of attribute information of all points in the LOD layer need to be written into the bitstream, and in response to the number of points in the LOD layer being greater than or equal to the threshold T, determine that real values of attribute information of an (n×T)-th point need to be written into the bitstream. T is a positive integer greater than 1, and n is a positive integer greater than or equal to 0.

In some embodiments of the disclosure, the first processing unit 710 is further configured to partition the point cloud into one or more LOD layers. Each LOD layer includes one or more points.

It is to be understood that the device embodiments and the method embodiments may correspond to each other, and similar descriptions may refer to the method embodiments, and are not elaborated here to avoid repetition. Specifically, the encoder 700 illustrated in FIG. 8 may correspond to an execution body for executing the method 500 according to an embodiment of the disclosure, and the foregoing and other operations and/or functions of modules in the encoder 700 implement corresponding processes in the method illustrated in FIG. 6 respectively, and are not elaborated here for brevity.

According to another aspect of the disclosure, a codec system is also provided, including the above encoder and a decoder corresponding to the encoder.

The device and system of the embodiments of the disclosure are described above with reference to the drawings from the perspective of functional modules. It should be understood that the functional module may be implemented in a hardware form, or may be implemented by an instruction in a software form, or may be implemented by a combination of hardware and software modules. Specifically, operations of the method embodiments in the embodiments of the disclosure may be completed via an integrated logic circuit of hardware in a processor or an instruction in a software form. The operations of the methods disclosed in combination the embodiments of the disclosure may be directly embodied to be executed and completed by a hardware decoding processor or executed and completed by a combination of hardware and software modules in the decoding processor. Alternatively, the software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information from the memory and completes the operations of the foregoing methods in combination with the hardware of the processor.

Figure 9:
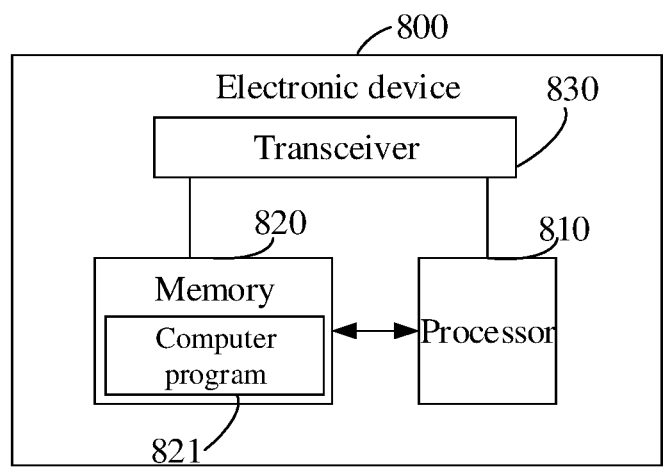
FIG. 9 is a schematic block diagram of an electronic device according to an embodiment of the disclosure.

FIG. 9 is a schematic block diagram of an electronic device 800 according to an embodiment of the disclosure.

As illustrated in FIG. 9, the electronic device 800 may include a memory 820 and a processor 810.

The memory 820 is configured to store a computer program 821 and transmit the computer program 821 to the processor 810. In other words, the processor 810 may call and run the computer program 821 from the memory 820, to implement the methods in the embodiments of the disclosure.

For example, the processor 810 may be configured to perform operations in the method 300 according to instructions in the computer program 821.

In some embodiments of the disclosure, the processor 810 may include, but is not limited to, a universal processor, a Digital Signal Processor (DSP), an Application Specific Integrated Circuit (ASIC) and a Field Programmable Gate Array (FPGA) or other programmable logic devices, discrete gates or transistor logic devices, and discrete hardware component.

In some embodiments of the disclosure, the memory 820 includes, but is not limited to a volatile memory and/or a non-volatile memory.

The non-volatile memory may be an ROM, a PROM, an Erasable PROM (EPROM), an Electrically EPROM (EEPROM) or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM).

In some embodiments of the disclosure, the computer program 821 may be divided into one or more modules, and the one or more modules are stored in the memory 820 and executed by the processor 810, to complete the method for recording a page provided in the disclosure. The one or more modules may be a series of computer program instruction segments capable of completing specific functions, and the instruction segments are used to describe an execution process of the computer program 821 in the electronic device 800.

As illustrated in FIG. 9, the electronic device 800 may further include a transceiver 830.

The transceiver 830 may be connected to the processor 810 or the memory 820.

The processor 810 may control the transceiver 830 to communicate with other devices, and specifically, may transmit information or data to other devices, or receive information or data transmitted by other devices. The transceiver 830 may include a transmitter and a receiver. The transceiver 830 may further include an antenna, and there may be one or more antennas.

It should be understood that components in the electronic device 800 are connected by a bus system. The bus system further includes a power bus, a control bus, and a state signal bus, in addition to a data bus.

According to an aspect of the disclosure, there is provided a computer storage medium, having stored thereon a computer program. The computer program, when being executed by a computer, enables the computer to execute the methods in the above method embodiments. Or, the embodiments of the disclosure further provide a computer program product including instructions, and the instructions, when being executed by a computer, enable the computer to execute the methods in the above method embodiments.

According to another aspect of the disclosure, there is provided a computer program product or a computer program. The computer program product or the computer program includes computer instructions, and the computer instructions are stored in a computer-readable storage medium. A processor of a computer device reads and executes the computer instructions from the computer-readable storage medium, to enable the computer device to execute the methods in the above method embodiments.

In other words, when the methods are implemented in software, all or part of the methods may be implemented in form of a computer program product. The computer program product includes one or more computer instructions. When the computer program instructions are loaded and executed on a computer, all or part of the processes or functions according to the embodiments of the disclosure are generated. The computer may be a general purpose computer, a special purpose computer, a computer network, or another programmable device. The computer instructions may be stored in a computer-readable storage medium or transmitted from a computer-readable storage medium to another computer-readable storage medium, for example, the computer instructions may be transmitted from a website, computer, server or data center to another website, computer, server or data center via wired (such as a coaxial cable, an optical fiber, a digital subscriber line (DSL)) or wireless (such as infrared, radio, microwave, or the like). The computer readable storage medium may be any available medium that may be accessed by a computer, or data storage devices such as a server or a data center which are integrated with one or more available media. The available media may be magnetic media (e.g., a floppy disk, hard disk, magnetic tape), an optical media (e.g., DVD), or a semiconductor media (e.g., Solid State Disk (SSD)) and the like.

Those of ordinary skill in the art may realize that modules and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

In some embodiments provided by the disclosure, it is to be understood that the disclosed system, device and method may be implemented in another manner. For example, the device embodiment described above is only schematic, and for example, division of the modules is only logic function division, and other division manners may be adopted during practical implementation. For example, multiple modules or components may be combined or integrated into another system, or some characteristics may be neglected or not executed. In addition, coupling or direct coupling or communication connection between each displayed or discussed component may be indirect coupling or communication connection, implemented through some interfaces, of the device or the modules, and may be electrical and mechanical or adopt other forms.

The modules described as separate parts may or may not be physically separated, and parts displayed as modules may or may not be physical modules, and namely may be located in the same place, or may also be distributed to multiple network units. Part or all of the modules may be selected to achieve the purpose of the solutions of the embodiments according to a practical requirement. For example, functional modules in the embodiments of the disclosure may be integrated into a processing module, or each module may physically exist independently, or two or more than two module may be integrated into a module.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for decoding a point cloud, comprising:
    parsing a bitstream of the point cloud, to obtain reconstructed information of position information of a target point in the point cloud;
    obtaining predicted values of attribute information of the target point according to the reconstruction information of the position information of the target point;
    parsing the bitstream to obtain residual values of the attribute information of the target point;
    obtaining initial reconstructed values of the attribute information of the target point according to the predicted values and the residual values of the attribute information of the target point;
    filtering the initial reconstructed values of the attribute information of the target point by using a Kalman filtering algorithm, to obtain final reconstructed values of the attribute information of the target point; and
    obtaining a decoded point cloud according to the final reconstructed values of the attribute information of the target point;
    wherein the method further comprises: for a level of detail (LOD) layer in the point cloud,
    in response to a number of points in the LOD layer being less than a threshold T, replacing final reconstructed values of attribute information of all points in the LOD layer by real values of the attribute information; and
    in response to the number of points in the LOD layer being greater than or equal to the threshold T, replacing final reconstructed values of attribute information of an (n×T)-th point by real values of the attribute information, wherein T is a positive integer greater than 1, and n is a positive integer greater than or equal to 0.

2. The method of claim 1, wherein filtering the initial reconstructed values of the attribute information of the target point by using the Kalman filtering algorithm, to obtain the final reconstructed values of the attribute information of the target point comprises:
    filtering the initial reconstructed values of the attribute information of the target point by using the Kalman filtering algorithm and taking reconstructed values of attribute information of one or more points before the target point as measurement values, to obtain the final reconstructed values of the attribute information of the target point.

3. The method of claim 2, wherein the one or more points before the target point are one or more points before the target point in a decoding order.

4. The method of claim 1, further comprising:
    parsing the bitstream, to obtain a number of points in the bitstream of which final reconstructed values of attribute information are real values and the real values of the attribute information of the points.

5. The method of claim 1, further comprising:
    partitioning the point cloud into one or more LOD layers, each LOD layer comprising one or more points.

6. A method for encoding a point cloud, comprising:
    processing position information of a target point in the point cloud, to obtain reconstruction information of the position information of the target point;
    obtaining predicted values of attribute information of the target point according to the reconstruction information of the position information of the target point;
    processing the attribute information of the target point in the point cloud, to obtain real values of the attribute information of the target point;
    obtaining residual values of the attribute information of the target point according to the predicted values and the real values of the attribute information of the target point; and
    encoding a number of real values of attribute information of points need to be written into a bitstream, the real values of the attribute information of the points need to be written into the bitstream, and the residual values of the attribute information of the target point, to obtain the bitstream;

wherein the method further comprises: for a level of detail (LOD) layer in the point cloud, in response to a number of points in the LOD layer being less than a threshold T, determining that real values of attribute information of all points in the LOD layer need to be written into the bitstream; and in response to the number of points in the LOD layer being greater than or equal to the threshold T, determining that real values of attribute information of an (n×T)-th point need to be written into the bitstream, wherein T is a positive integer greater than 1, and n is a positive integer greater than or equal to 0.

7. The method of claim 6, further comprising:

partitioning the point cloud into one or more LOD layers, each LOD layer comprising one or more points.

8. A decoder, comprising: a memory for storing a computer program and a processor, wherein the processor is configured to execute the computer program stored in the memory to:

parse a bitstream of a point cloud to obtain reconstructed information of position information of a target point in the point cloud;

obtain predicted values of attribute information of the target point according to the reconstruction information of the position information of the target point;

parse the bitstream to obtain residual values of the attribute information of the target point;

obtain initial reconstructed values of the attribute information of the target point according to the predicted values and the residual values of the attribute information of the target point;

filter the initial reconstructed values of the attribute information of the target point by using a Kalman filtering algorithm, to obtain final reconstructed values of the attribute information of the target point; and obtain a decoded point cloud according to the final reconstructed values of the attribute information of the target point;

wherein the processor is further configured to execute the computer program to: for a level of detail (LOD) layer in the point cloud, in response to a number of points in the LOD layer being less than a threshold T, replace final reconstructed values of attribute information of all points in the LOD layer by real values of the attribute information; and in response to the number of points in the LOD layer being greater than or equal to the threshold T, replace final reconstructed values of attribute information of an (n×T)-th point by real values of the attribute information, wherein T is a positive integer greater than 1, and n is a positive integer greater than or equal to 0.

9. An encoder, comprising: a memory for storing a computer program and a processor, wherein the processor is configured to execute the computer program stored in the memory to:

process position information of a target point in a point cloud, to obtain reconstruction information of the position information of the target point;

obtain predicted values of attribute information of the target point according to the reconstruction information of the position information of the target point;

process the attribute information of the target point in the point cloud, to obtain real values of the attribute information of the target point;

obtain residual values of the attribute information of the target point according to the predicted values and the real values of the attribute information of the target point; and encode a number of real values of attribute information of points need to be written into a bitstream, the real values of the attribute information of the points need to be written into the bitstream, and the residual values of the attribute information of the target point, to obtain the bitstream;

wherein the processor is further configured to execute the computer program to: for a level of detail (LOD) layer in the point cloud, in response to a number of points in the LOD layer being less than a threshold T, determine that real values of attribute information of all points in the LOD layer need to be written into the bitstream; and in response to the number of points in the LOD layer being greater than or equal to the threshold T, determine that real values of attribute information of an (n×T)-th point need to be written into the bitstream, wherein T is a positive integer greater than 1, and n is a positive integer greater than or equal to 0.

* * * * *